(No Model.) 4 Sheets—Sheet 1.
F. H. SCHULE.
GRAIN SEPARATING MACHINE.
No. 559,815. Patented May 12, 1896.
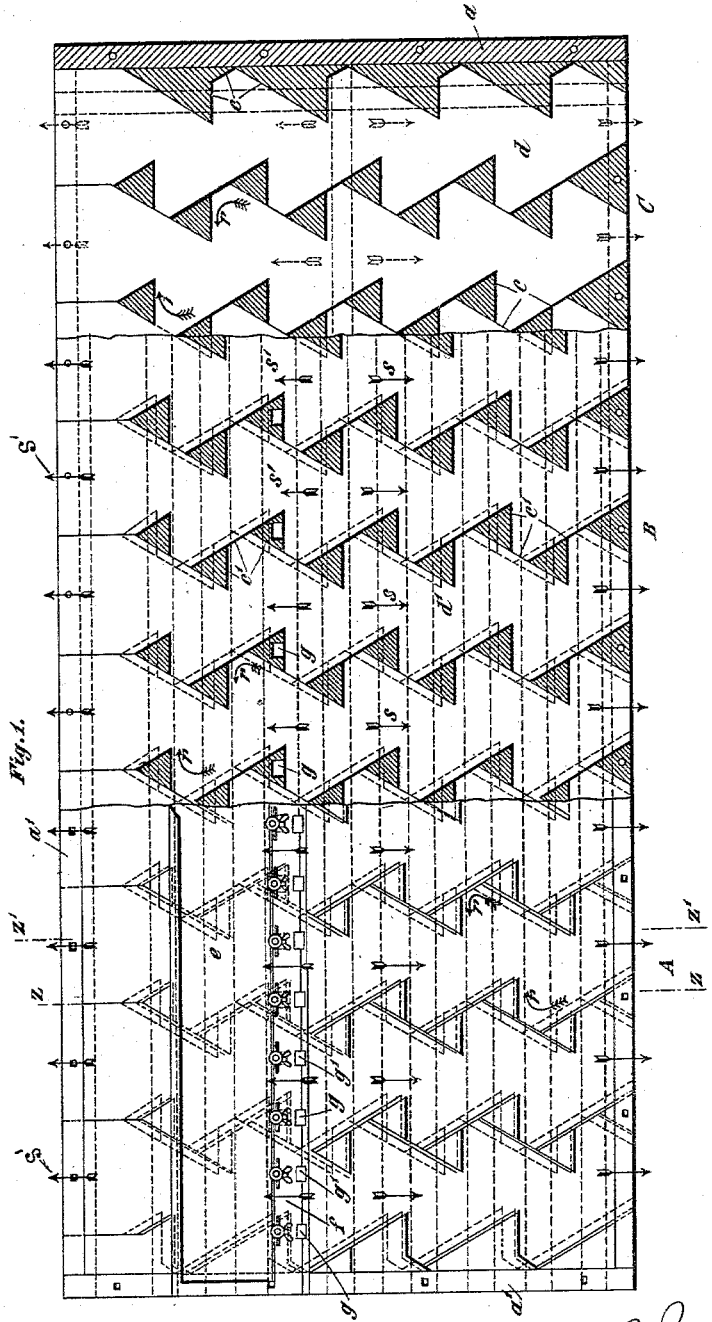
Witnesses:
H. K. Boulter
O. S. Northrup
Inventor:
Friedrich H. Schule
By Wm E. Boulter,
Associate Attorney (No Model.)  
F. H. SCHULE.  
GRAIN SEPARATING MACHINE.  
4 Sheets—Sheet 2.
No. 559,815. Patented May 12, 1896.
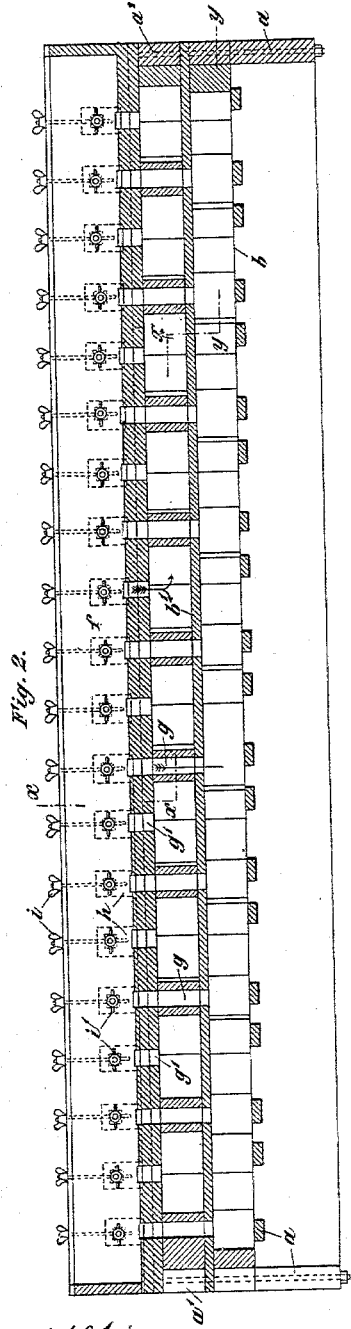
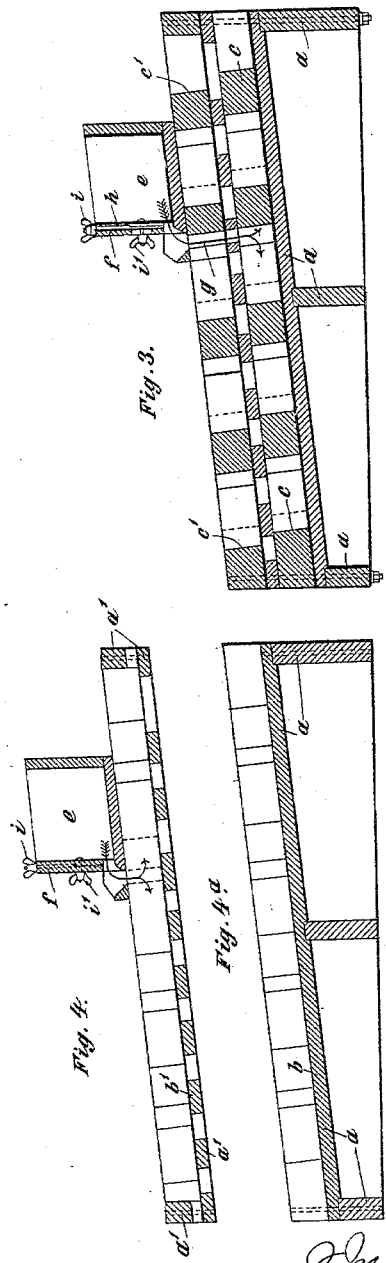
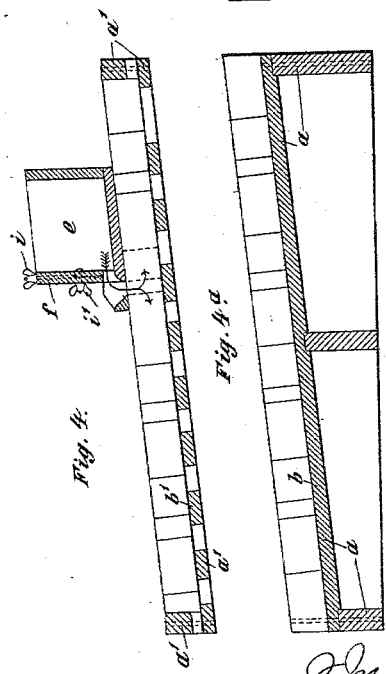
Witnesses:  
H. K. Boulter  
O. Northup
Inventor:—  
Friedrich H. Schule  
By Wm E. Boulter  
Associate Attorney.

(No Model.) 4 Sheets—Sheet 3.
F. H. SCHULE.
GRAIN SEPARATING MACHINE.
No. 559,815. Patented May 12, 1896.
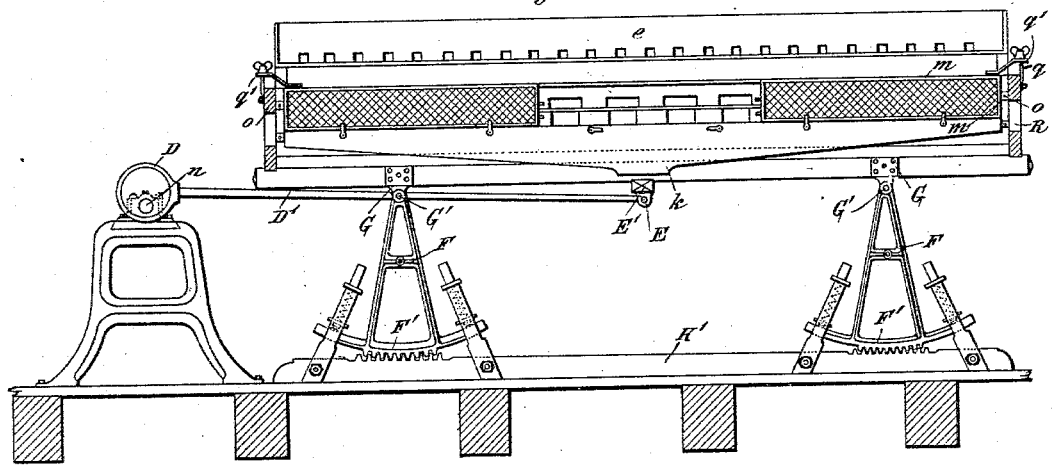
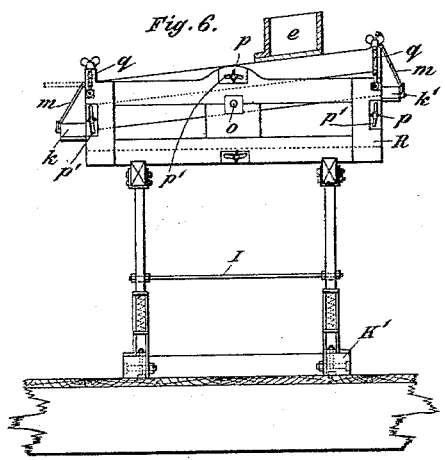
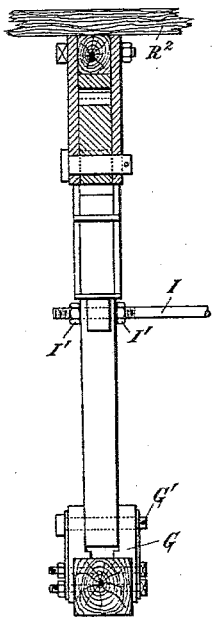
Witnesses:—
H. K. Boulter
O. L. Northup
Inventor:—
Friedrich H. Schule
By Wm. E. Boulter,
Associate Attorney

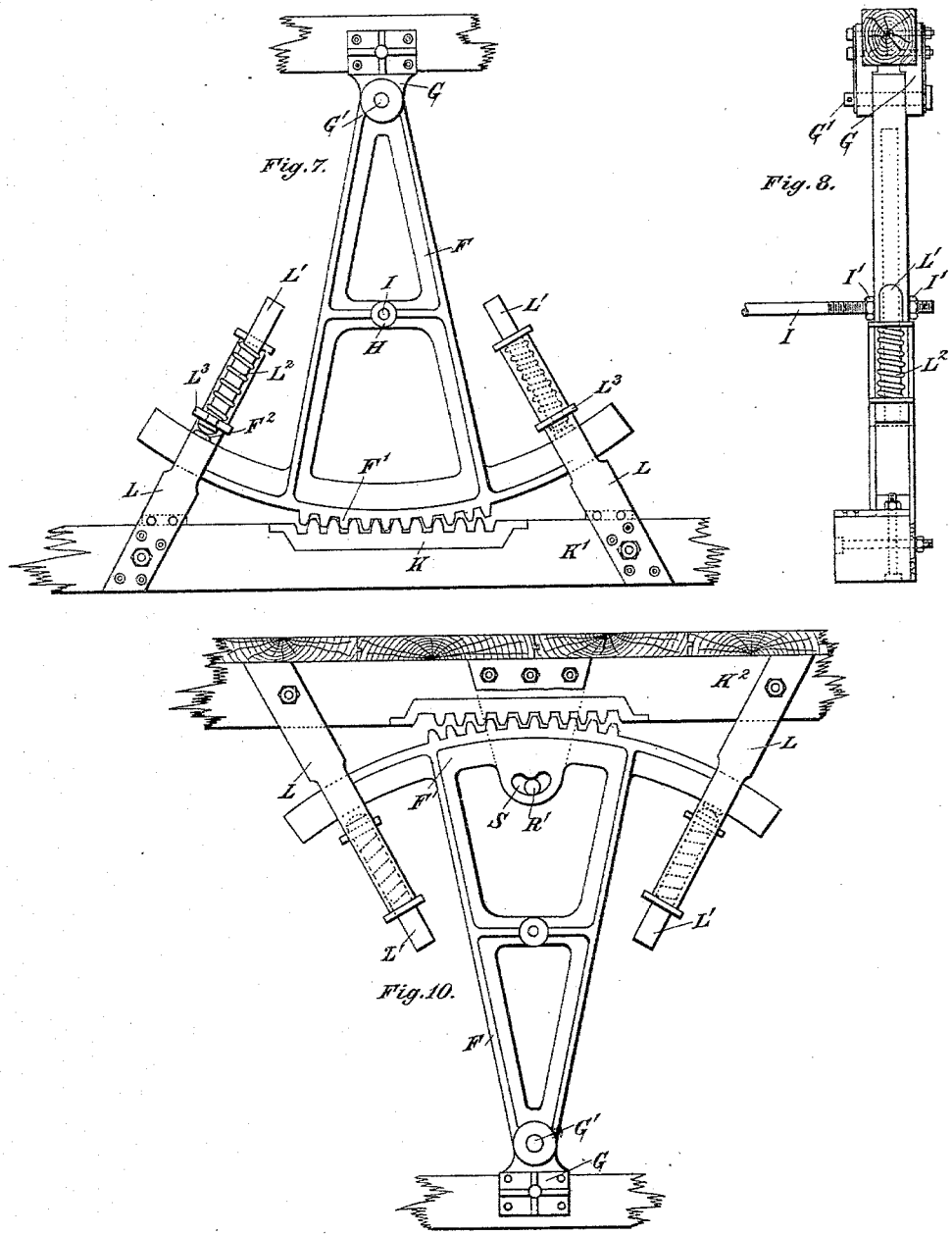

UNITED STATES PATENT OFFICE.

FRIEDRICH HERMANN SCHULE, OF HAMBURG, GERMANY.

GRAIN-SEPARATING MACHINE.

SPECIFICATION forming part of Letters Patent No. 559,815, dated May 12, 1896.

Application filed August 22, 1894. Serial No. 520,996. (No model.)

*To all whom it may concern:*

Be it known that I, FRIEDRICH HERMANN SCHULE, millwright, of Eilbeckerweg 57, Hamburg, in the Empire of Germany, have invented Improvements in Grain-Separating Machines, of which the following is a specification, reference being had therein to the accompanying drawings.

This invention relates to a new or improved machine for sorting cereals and removing stones and grit therefrom, and it is specially adapted for the separation of foreign materials from cereals when they differ from the latter by their volume as well as by their specific gravity. Such a separation cannot be performed by means of sieves. The machine, which is particularly suitable for sorting shelled as well as unshelled rice, differs chiefly from other machines of a similar construction by having a new form of sheet-metal receiver, which enables a machine of reduced size and power to give a continuous and rapid output. Owing to the improved form of this sheet-metal receiver, which is provided with throw-plates, hereinafter more particularly described, its surface is not soiled on coming in contact with the grain, and the injurious effects heretofore experienced from this cause are therefore obviated. The machine also differs from other machines in having improved adjusting mechanism by means of which the principal part of the machine—*i. e.*, the shaking mechanism supporting the sheet-metal receiver—can be set and fixed in a more or less inclined position, according to the material to be treated, so as to allow the sides of the said shaking mechanism, which carry the discharge-outlet for the sorted material, to be always free and easily accessible.

A further feature of the invention consists in the peculiar construction of the supporting-framework carrying the shaking mechanism, which is so devised that it enables the mechanism to move constantly in one plane and not in an undulating manner, as is usual with apparatus having suspended or spring-supported shaking mechanism. The framework is also so devised that all the shocks which usually occur in this class of machines are fully equalized or deadened.

On the accompanying sheets of drawings a machine provided with my improvements is shown having twenty working chambers or compartments in two tiers—ten below and ten above.

Figure 1 is a view of the shaking mechanism, the part A being a plan, the part B a horizontal section on the line $xx$, Fig. 2—*i. e.*, through the upper tier of compartments—and the part C a horizontal section through the lower tier on the line $yy$, Fig. 2. Fig. 2 is a longitudinal section of the machine. Fig. 3 is a cross-section on the line $zz$, Fig. 1. Fig. 4 is a cross-section of the upper division or tier of the shaking mechanism. Fig. $4^a$ is a cross-section of the lower division or tier of the shaking mechanism, taken on the line $z'z'$, Fig. 1. Fig. 5 is a front view of the machine. Fig. 6 is a side view thereof. Fig. 7 is an enlarged front view of the supporting-framework. Fig. 8 is a side view of the same. Figs. 9 and 10 show modifications of Figs. 7 and 8.

The shaking mechanism consists chiefly of an under frame $a\,a$ and of an upper frame $a'\,a'$, Figs. 1 to $4^a$. The sloping bottoms of these frames are lined with sheet-metal plates $b\,b'$, Figs. 4 and $4^a$, and form the receivers upon which the throw-plates $c$ and $c'$, Figs. 1 and 3, consisting of polished steel plates, are screwed or otherwise fixed. These throw-plates are arranged in a peculiar manner, as clearly shown at Fig. 1, and form with their ground or polished surfaces, in conjunction with the plates $b$ and $b'$, the two divisions or tiers $d\,d'$ for the work.

The machine is fed through the trough $e$, which extends across the whole length of the shaking mechanism and whose front sides $f$ are furnished with outlets for feeding the two separate divisions or tiers. These outlets correspond with the channels $g$ and $g'$. As clearly shown at Figs. 2 and 3, the channels $g$ lead from the trough $e$ to the lower division $d$, while the channels $g'$ lead to the upper division $d'$. The outlets in the front wall $f$ of the trough $e$ may be used independently of one another and be closed and opened as desired by means of the slides $h$, which can be raised and lowered by means of the thumb-nuts $i$ on the ends of their spindles. The slides are adjusted by the thumb-nuts $i'$.

The material when treated falls into collecting-canals $k\,k'$, and in order to prevent it bounding over the edges of these canals a frame $m$, covered with wire-gauze or its equivalent, extends from the upper longitudinal edges of the shaking device to the upper edges of the canals (see Figs. 5 and 6) and forms a partition between the outlet and said canals. These frames $m$ are preferably made in several parts or sections, which are so arranged as to turn with their upper sides against the upper edge of the shaking device. The divisions or sections can be firmly fixed to the canals by means of bolts, joints, or straps. The object of this arrangement is to enable each division to be separately lifted and ventilated during the sorting operation and while the sorted material issuing from each of the two working divisions is separately controlled.

In Fig. 5 the central division is shown as raised while the side ones are folded down.

For the purpose of regulating the degree of slope or incline of the shaking device, Fig. 6, it is fitted on a strong frame R, with its transverse sides turning on pins or pivots $o$, and movement in a vertical plane is given to it by means of the set-screws $q$, which are fixed to the frame R and engage with brackets $q'$, secured to the shaking device.

The device when shifted to the desired angle by means of the screws $q$ can be fixed in position by means of clamping-screws $p$, secured to it and which pass through slots $p'$ in the frame, so as to be tightened up on the outside by means of thumb-nuts.

The shaking device rests upon toothed sectors F, Figs. 5 to 8, which are so suspended from bolts G', passed through lugs G on the frame R, as to turn freely thereon. Reciprocatory motion is imparted to the device by means of a crank-shaft and connecting-rod, or, as shown at Fig. 5, by means of a shaft $n$, having an eccentric D, whose rod D' is secured to a pin-joint E, fitted in the lug E' at the bottom of the frame R. It will be readily understood that under these conditions when the shaft $n$ is revolved the frame must move back and forward in a horizontal plane.

In order to take up the shocks of the machine and to prevent the toothed sectors slipping, the supporting-framework is made to assume the peculiar form shown at Figs. 7 and 8, where the beams K', which serve as a bed for the machine, have inserted in them racks K, with which the teeth F' of the sectors mesh. Both ends of the arc of the sector carry blocks F², against which bear rounded heads of bolts L', which are passed through guide-holes in cross-pieces at the top of stays L, secured to the beam K', as shown. Spiral springs L², rubber cushions, or buffers are, as shown, mounted on the bolts, which latter are guided in their movements in the stays L by means of sliding pieces or washers L³. The whole shaking mechanism, which is held in position by the stays L, thus rests upon four toothed sectors somewhat in the same manner as a carriage on four wheels. The two front and two rear sectors are coupled together by bolts I, which pass through holes H, Fig. 7, and are firmly secured by jam-nuts I'. (See Fig. 8.) This supported framework can, if desired, without difficulty be converted into a suspended framework, as shown at Figs. 9 and 10. In this case the arcs F' are held in position by means of pins R', passed through slots S in the sectors and also in lugs secured to the overhead beam K².

R², Figs. 9 and 10, is the ceiling of the workshop.

The *modus operandi* is as follows: After loosening the screws $p$ the shaking device is adjusted to the required slope by the screws $q$, and the screws $p$ are then again tightened. The shaft $n$ is now set in motion by means of the usual driving-gear (fast and loose pulleys) and the shaking device is reciprocated in the direction of the arrows P, Fig. 1. The material to be sorted is dropped into the trough $e$, so as to run uniformly through the outlets therefrom down into the canals $g$ $g'$ and be distributed according to the positions of the slides $h$. As soon as the sorted material has passed these canals it falls into the different chambers, where it is operated on by the working surfaces of the throw-plates $c$ $c'$. These surfaces have in plan the form of a saw whose teeth point in the direction of the arrows $s'$ and form with each other partly two obtuse angles, as shown in Fig. 1. As a consequence the material, when it falls on the bottom plates $b$ $b'$, receives a somewhat whirling or eddying motion, corresponding to the direction of the arrows $r$, and is energetically mixed. The larger and heavier component parts roll by virtue of their gravity in the direction of the arrows $s$ down into the collecting canal or trough $k$, Fig. 6, while the lighter and finer component parts, on account of their mobility, do not adhere to the inclined planes, but are seized by the slant working surfaces and move forward in the direction of the arrows $s'$, and finally fall into the collecting canal or trough $k'$. As already mentioned, by raising the frame $m$ the material dropping from the two divisions can be conveniently controlled. The supporting-framework operates in such a manner that the rear springs L², Fig. 7, are stretched when the shaking device moves forward, and thereby takes up the shocks of the machine when it moves in this direction, while the front springs are stretched and take up the shocks when it moves in the opposite direction.

What I claim, and desire to secure by Letters Patent of the United States, is—

1. In a machine of the character described, the combination with several series of shaking or separating compartments, arranged one above the other as described, a feed-hopper, independent feed connections between the same and said several series of compartments, collecting-chambers arranged upon opposite sides of the machine and communicating with the compartments and wire-gauze partitions or guards comprising several sections arranged over said collecting-chambers and adapted to be lifted as described.

2. In a machine of the character described, the combination with a suitable supporting-frame, and means for absorbing or neutralizing the shocks resulting from the operation of the machine comprising sector-shaped supports jointed to the frame, stays carrying springs bearing upon said supports at opposite sides said springs being adapted to be alternately compressed and expanded when said supports are swung in opposite directions, teeth formed on said supports, and teeth on the supporting-frame meshing with the teeth on the supports as and for the purpose specified.

In witness whereof I have hereunto set my hand in presence of two witnesses.

FRIEDRICH HERMANN SCHULE.

Witnesses:
GUSTAV WEBER,
E. H. L. MUMMENHOFF.